US012803324B2

(12) United States Patent
Nagabhushanrao et al.

(10) Patent No.: US 12,803,324 B2
(45) Date of Patent: Nov. 17, 2026

(54) UPS FOR CRITICAL AND NON-CRITICAL LOADS

(71) Applicant: SCHNEIDER ELECTRIC IT CORPORATION, Foxboro, MA (US)

(72) Inventors: Pradeep Tolakanahalli Nagabhushanrao, Bangalore (IN); Anurag Arjundas Jivanani, Groton, MA (US)

(73) Assignee: Schneider Electric IT Corporation, Andover, MA (US)

( * ) Notice: Subject to any disclaimer, the term of this patent is extended or adjusted under 35 U.S.C. 154(b) by 0 days.

(21) Appl. No.: 19/049,148

(22) Filed: Feb. 10, 2025

(65) Prior Publication Data

US 2025/0300487 A1 Sep. 25, 2025

(30) Foreign Application Priority Data

Mar. 21, 2024 (IN) ............................ 202411021627

(51) Int. Cl.
*H02J 9/06* (2006.01)
*H02J 3/0012* (2026.01)
*H02J 3/32* (2006.01)

(52) U.S. Cl.
CPC ............ *H02J 9/062* (2013.01); *H02J 3/0012* (2020.01); *H02J 3/32* (2013.01)

(58) Field of Classification Search
CPC ............. H02J 9/062; H02J 3/0012; H02J 3/32
See application file for complete search history.

(56) References Cited

U.S. PATENT DOCUMENTS

| | | | | |
|---|---|---|---|---|
| 5,811,960 | A * | 9/1998 | Van Sickle ............. | H02J 9/066 322/4 |
| 6,737,762 | B2 * | 5/2004 | Koenig .................. | H02J 9/062 307/64 |
| 12,633,769 | B2 * | 5/2026 | Masui ..................... | H02J 9/061 |
| 2003/0080622 | A1 | 5/2003 | Koenig | |
| 2016/0126788 | A1 | 5/2016 | Liao et al. | |
| 2021/0237670 | A1 * | 8/2021 | Takahara ............. | B60R 16/033 |
| 2023/0318351 | A1 | 10/2023 | Brun | |

OTHER PUBLICATIONS

European Search Report for Application 25164659.2 dated Sep. 16, 2025, 10 pages.

* cited by examiner

*Primary Examiner* — Daniel Cavallari
(74) *Attorney, Agent, or Firm* — Patterson + Sheridan, LLP

(57) ABSTRACT

An uninterruptable power supply is disclosed. The uninterruptable power supply includes an input, a first output, and a second output. The uninterruptable power supply includes a first bypass line coupled between the input and the second output. The uninterruptable power supply further includes a first output connector configured to be coupled to a first load. The uninterruptable power supply includes a second output connector configured to be coupled to a second load. The uninterruptable power supply additionally includes a first relay configured to selectively couple the second output connector to either the first output or the first bypass line. A non-transitory computer-readable medium storing thereon instructions for operating an uninterruptable power supply is disclosed. Methods of operating an uninterruptable power supply are also disclosed.

20 Claims, 3 Drawing Sheets

UPS FOR CRITICAL AND NON-CRITICAL LOADS

CROSS-REFERENCE TO RELATED APPLICATIONS

This application claims priority under 35 U.S.C. § 119(a) to Indian Provisional Application No. 202411021627, titled "UPS for Critical and Non-Critical Loads" filed Mar. 21, 2024, which is incorporated herein by reference in its entirety for all purposes.

SUMMARY OF THE INVENTION

Power devices, such as uninterruptible power supplies, may be used to provide regulated, uninterrupted power for sensitive and/or critical loads, such as computer systems and other data-processing systems. Existing uninterruptible power supplies include online uninterruptible power supplies, offline uninterruptible power supplies, line-interactive uninterruptible power supplies, as well as others. Uninterruptible power supplies may provide output power to a load. The output power may be derived from a primary source of power, such as a utility, e.g., mains, source, and/or derived from a backup source of power, such as an energy storage device, e.g., a battery.

At least one example in accordance with the present disclosure relates generally to an uninterruptible power supply having discrete power delivery for loads that are deemed critical, i.e., loads that must remain powered on at all times, and loads that are deemed non-critical.

In accordance with at least one aspect, there is provided an uninterruptible power supply (UPS). The uninterruptible power supply may include an input. The uninterruptible power supply may include a first output and a second output. The uninterruptible power supply further may include a first bypass line coupled between the input and the second output. The uninterruptible power supply may include a first output connector configured to be coupled to a first load. The uninterruptible power supply further may include a second output connector configured to be coupled to a second load. The uninterruptible power supply additionally may include a first relay configured to selectively couple the second output connector to either the first output or the first bypass line.

In some embodiments, the uninterruptible power supply further may include a controller. The controller may be configured to monitor an input parameter of the input power at the input. The controller may be configured to operate the first relay to couple the second output connector to the first bypass line in response to the input parameter being within a first range. The controller may be configured to operate the first relay to couple the second output connector to the first output connector in response to the input parameter being outside of the first range.

In some embodiments, the input parameter may be at least one of an input voltage of the input power or an input frequency of the input power. The first range for the input parameter may be about ±30 V range about a magnitude of a nominal input voltage. In some embodiments, the first range for the input parameter may be about ±3 Hz about a magnitude of a nominal input frequency of the input power.

In some embodiments, the uninterruptible power supply further may include a third output connector, a second bypass line coupled between the input and the third output connector, and a second relay configured to selectively couple the first output to either the first output connector or the second bypass line.

In further embodiments, the controller may be configured, in a startup mode of operation, to operate the second relay to couple the first output connector to the second bypass line and, subsequent to the input power being provided to the first output via the second bypass line for a period of time, operate the second relay to couple the first output connector to the first output.

In further embodiments, the uninterruptible power supply may include a backup interface configured to be coupled to a backup power source and to receive backup power from the backup power source. The controller may be configured to operate in a backup mode of operation in response to the input parameter being outside of a second range. The controller may be configured to operate, in the backup mode of operation, the power conversion circuitry to convert the backup power into the regulated output power. The controller may be further configured to operate, in the backup mode of operation, the first relay to couple the second output connector to the first output.

In accordance with at least one aspect, there is provided a non-transitory computer-readable medium storing thereon instructions for operating an uninterruptable power supply. The uninterruptable power supply may include an input, a first output, a second output; a first bypass line coupled between the input and the second output; a first output connector coupled to a first load, and a second output connector coupled to a second load. The instructions may instruct at least one processor to control the UPS to monitor an input parameter of an input power received by the input. The instructions may instruct at least one processor to control the UPS operate the power conversion circuitry to convert the input power into regulated output power. The instructions further may instruct at least one processor to control the UPS to provide output power to the first output connector via the first output. The instructions may instruct at least one processor to control the UPS to operate a first relay to couple the second output connector to the first bypass line in response to the input parameter being within a first range such that the input power is provided to the second output connector. The instructions additionally may instruct at least one processor to control the UPS to operate the first relay to couple the second output connector to the first output in response to the input parameter being outside of the first range, such that the output power is provided to the second output connector.

In some embodiments, the input parameter may be at least one of an input voltage of the input power or an input frequency of the input power. In further embodiments, the instructions may instruct the at least one processor to control the UPS to operate the first relay to couple the second output connector to the first bypass line in response to the input voltage of the input power being within a ±30 V range about a magnitude of a nominal input voltage.

In further embodiments, the instructions may instruct the at least one processor to control the UPS to operate the first relay to couple the second output connector to the first bypass line in response to the input frequency of the input power being within a ±3 Hz range about a magnitude of a nominal input frequency of the input power.

In some embodiments, the UPS further may include a third output, and a second bypass line coupled between the input and the third output. In this configuration, the instructions further may instruct the at least one processor to control the UPS, in a startup mode of operation, to operate a second relay to couple the first output connector to the second bypass line such that the input power is provided to the first output connector. In further embodiments, the instructions may instruct the at least one processor to control the UPS, subsequent to the input power being provided to the first output via the second bypass line for a period of time, to operate the second relay to couple the first output connector to the first output.

In some embodiments, the UPS further may include a backup interface configured to be coupled to a backup power source and to receive backup power from the backup power source. In this configuration, the instructions further may instruct the at least one processor to control the UPS to operate in a backup mode of operation in response to the input parameter being outside of a second range. In some embodiments, the instructions further may instruct the at least one processor to control the UPS to operate, in the backup mode of operation, the power conversion circuitry to convert the backup power into the regulated output power. In some embodiments, the instructions further may instruct the at least one processor to control the UPS to operate, in the backup mode of operation, the first relay to couple the second output connector to the first output.

In accordance with at least one aspect, there is provided a method of operating an uninterruptable power supply. The uninterruptable power supply may include an input, a first output, a second output, a first bypass line coupled between the input and the second output, a first output connector coupled to a first load, and a second output connector coupled to a second load. The method may include monitoring an input parameter of an input power received by the input. The method further may include providing output power to the first output connector via the first output. The method further may include operating a first relay to couple the second output connector to the first bypass line in response to the input parameter being within a first range such that the input power is provided to the second output connector. The method additionally may include operating the first relay to couple the second output connector to the first output in response to the input parameter being outside of the first range such that the output power is provided to the second output connector.

In some embodiments, the input parameter may be at least one of an input voltage of the input power or an input frequency of the input power. In some embodiments, operating the first relay to couple the second output connector to the first bypass line includes operating the first relay to couple the second output connector to the first bypass line in response to the input voltage of the input power being within a ±30 V range about a magnitude of a nominal input voltage. In some embodiments, operating the first relay to couple the second output connector to the first bypass line may include operating the first relay to couple the second output connector to the first bypass line in response to the input frequency of the input power being within a ±3 Hz range about a magnitude of a nominal input frequency of the input power.

In further embodiments, the uninterruptable power supply may include a third output and a second bypass line coupled between the input and the third output. In this configuration, the method further may include operating, in a startup mode of operation, a second relay to couple the first output connector to the second bypass line such that the input power is provided to the first output connector. In further embodiments, the method may include, subsequent to the input power being provided to the first output via the second bypass line for a period of time in the startup mode of operation, operate the second relay to couple the first output connector to the first output.

In further embodiments, the uninterruptable power supply may include a backup interface configured to be coupled to a backup power source and to receive backup power from the backup power source. In this configuration, the method further may include operating the UPS in a backup mode of operation in response to the input parameter being outside of a second range. In further embodiments, the method may include operating, in the backup mode of operation, the power conversion circuitry to convert the backup power into the regulated output power. In further embodiments, the method may include operating, in the backup mode of operation, the first relay to couple the second output connector to the first output.

In accordance with at least one aspect, there is provided an uninterruptible power supply (UPS). The uninterruptible power supply may include an input configured to be coupled to a power source and to receive input power from the power source. The uninterruptible power supply may include power conversion circuitry coupled to the input and configured to convert the input power into regulated output power. The uninterruptible power supply may include a first output coupled to the power conversion circuitry and a second output. The uninterruptible power supply further may include a first bypass line coupled between the input and the second output and configured to provide the input power to the second output. The uninterruptible power supply may include a first output connector configured to be coupled to a first load and to receive the regulated output power from the power conversion circuitry. The uninterruptible power supply further may include a second output connector configured to be coupled to a second load. The uninterruptible power supply additionally may include a first relay configured to selectively couple the second output connector to either the first output or the first bypass line.

In accordance with at least one aspect, there is provided a non-transitory computer-readable medium storing thereon instructions for operating an uninterruptable power supply. The uninterruptable power supply may include an input coupled to a power source, power conversion circuitry coupled to the input, a first output coupled to the power conversion circuitry, a second output; a first bypass line coupled between the input and the second output; a first output connector coupled to a first load, and a second output connector coupled to a second load. The instructions may instruct at least one processor to control the UPS to monitor an input parameter of input power received by the input. The instructions may instruct at least one processor to control the UPS operate the power conversion circuitry to convert the input power into regulated output power. The instructions further may instruct at least one processor to control the UPS to provide the regulated output power to the first output connector via the first output. The instructions may instruct at least one processor to control the UPS to operate a first relay to couple the second output connector to the first bypass line in response to the input parameter being within a first range such that the input power is provided to the second output connector. The instructions additionally may instruct at least one processor to control the UPS to operate the first relay to couple the second output connector to the first output in response to the input parameter being outside of the first range, such that the regulated output power is provided to the second output connector.

In accordance with at least one aspect, there is provided a method of operating an uninterruptable power supply. The uninterruptable power supply may include an input coupled to a power source, power conversion circuitry coupled to the input, a first output coupled to the power conversion circuitry, a second output, a first bypass line coupled between the input and the second output, a first output connector coupled to a first load, and a second output connector coupled to a second load. The method may include monitoring an input parameter of input power received by the input. The method may include operating the power conversion circuitry to convert the input power into regulated output power. The method further may include providing the regulated output power to the first output connector via the first output. The method further may include operating a first relay to couple the second output connector to the first bypass line in response to the input parameter being within a first range such that the input power is provided to the second output connector. The method additionally may include operating the first relay to couple the second output connector to the first output in response to the input parameter being outside of the first range such that the regulated output power is provided to the second output connector.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
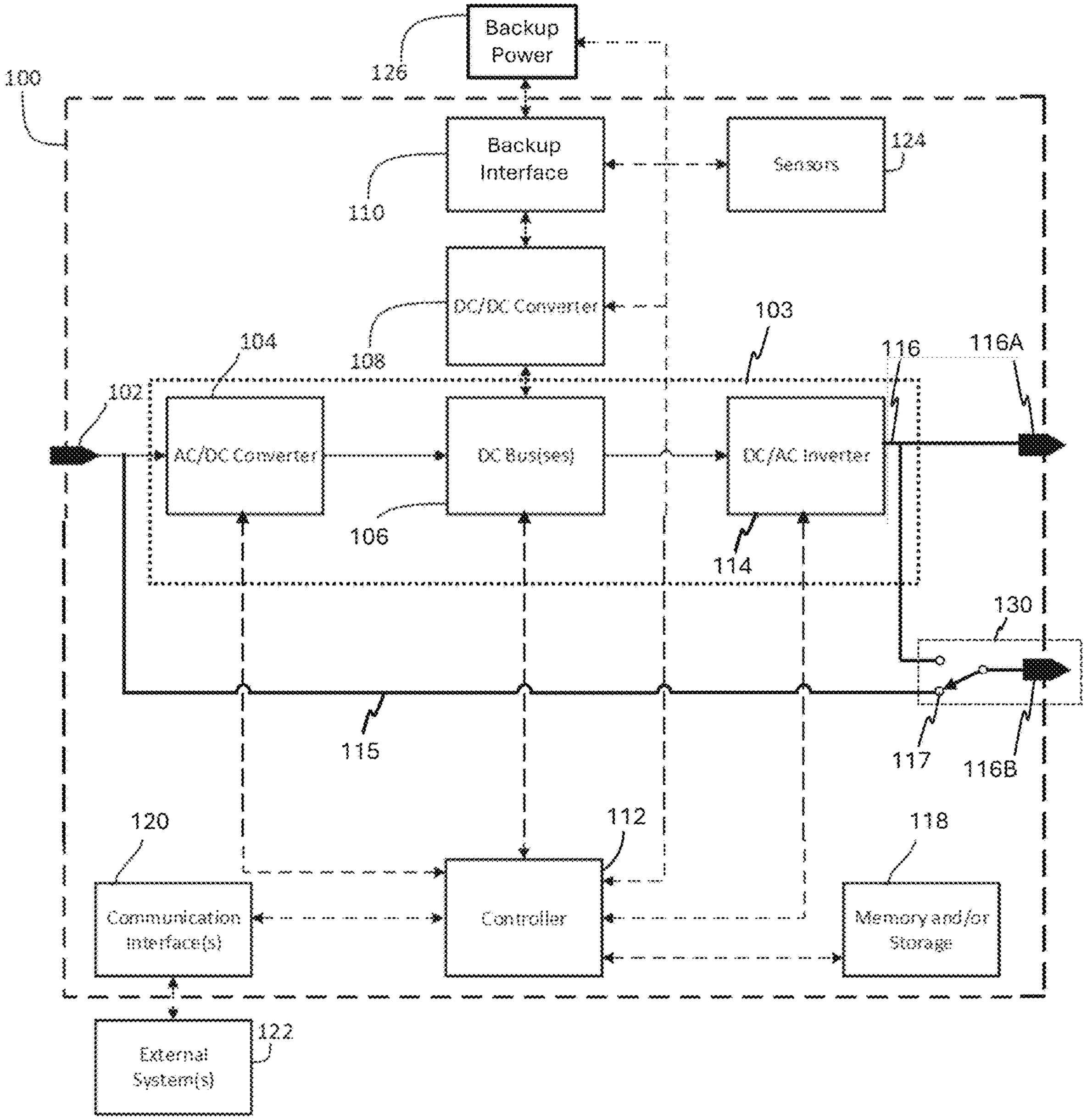
FIG. 1 is a block diagram of an example of a UPS, according to aspects of the invention.

Examples of the systems and methods discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

In a typical double conversion or online uninterruptible power supply (UPS), a bypass line can be included to allow a direct connection between an input of the UPS and an output of the UPS such that input AC power can be fed directly to an attached load as unregulated power, bypassing the double conversion circuitry of the UPS. It is common to configure the bypass line to operate in what is called "green mode." In an online UPS, green mode is an optional mode of operation set by the user that directly feeds attached loads from raw AC mains power as long as the mains voltage and/or frequency is within an acceptable green mode range. Green mode is a relatively efficient mode of operation as the input is coupled directly to the output via the bypass line and there are minimal losses in the bypass line. Typically, passing the input load through the bypass line achieves a power delivery efficiency exceeding 98%. In contrast, in at least some embodiments, when operating in typical double conversion/online mode, the power delivery efficiency can drop to about 94%. The transfer time from green mode to online mode, i.e., double conversion mode, can be achieved in less than 5 ms.

If the input mains voltage and/or frequency of the input AC power is outside of the acceptable green mode range, the UPS can revert to a double conversion or online mode where regulated output power is provided to the load. In the double conversion mode, the input AC power is converted to DC power with an AC-DC converter, the DC power is provided to a DC bus, and the DC power on the DC bus is converted back into output AC power with a DC-AC inverter. In the double conversion mode, the connected load is decoupled from abnormalities in the input AC power such as power swells or current surges. In the double conversion mode, a backup power source, e.g., a battery, can be charged with energy derived from the DC power on the DC bus.

If the input mains voltage and/or frequency is unavailable or at such a level that it is insufficient to power loads coupled to the UPS, the UPS can enter a backup mode of operation, where the DC-AC inverter draws DC power derived from a backup power source, e.g., a battery, instead of DC power derived from the input AC power, and converts the DC power into output AC power. Double conversion/online UPS systems not only can provide backup power in the event of a mains failure, but also can be used to supply a clean and conditioned power to sensitive or critical loads.

One concern of operating a connected load in green mode can be that since the load is fed directly from the input via the bypass line, there is compromised protection of the load against abnormal surges at the input. Accordingly, despite the benefits of green mode operation, there exists reluctance in the marketplace to operate in green mode due to the exposure of sensitive or critical loads to raw mains power. For example, a typical environment that deploys UPS units includes both critical, e.g., computers, servers, and resource monitors, and non-critical, e.g., peripherals, e.g., printers, copiers, and scanners, loads. It is common practice to connect both the critical and non-critical loads to the output such that all loads (critical or non-critical) are operated in the same mode. Accordingly, as discussed above, there is a hesitation to operate a traditional online UPS in green mode because it would expose the critical loads to potential abnormal conditions at the input.

As disclosed herein, the present disclosure overcomes the aforementioned problems with green mode by allowing non-critical loads coupled to a UPS to be operated in green mode while critical loads coupled to the UPS are operated in double conversion/online mode. In accordance with at least one aspect, there is provided an uninterruptible power supply (UPS). The uninterruptible power supply may include an input configured to be coupled to a power source and to receive input power from the power source. The uninterruptible power supply may include power conversion circuitry coupled to the input and configured to convert the input power into regulated output power. The uninterruptible power supply may include a first output coupled to the power conversion circuitry and a second output. The uninterruptible power supply further may include a first bypass line coupled between the input and the second output and configured to provide the input power to the second output. The uninterruptible power supply may include a first output connector configured to be coupled to a first load and to receive the regulated output power from the power conversion circuitry. The uninterruptible power supply further may include a second output connector configured to be coupled to a second load. The uninterruptible power supply additionally may include a first relay configured to selectively couple the second output connector to either the first output or the first bypass line.

Figure 2:
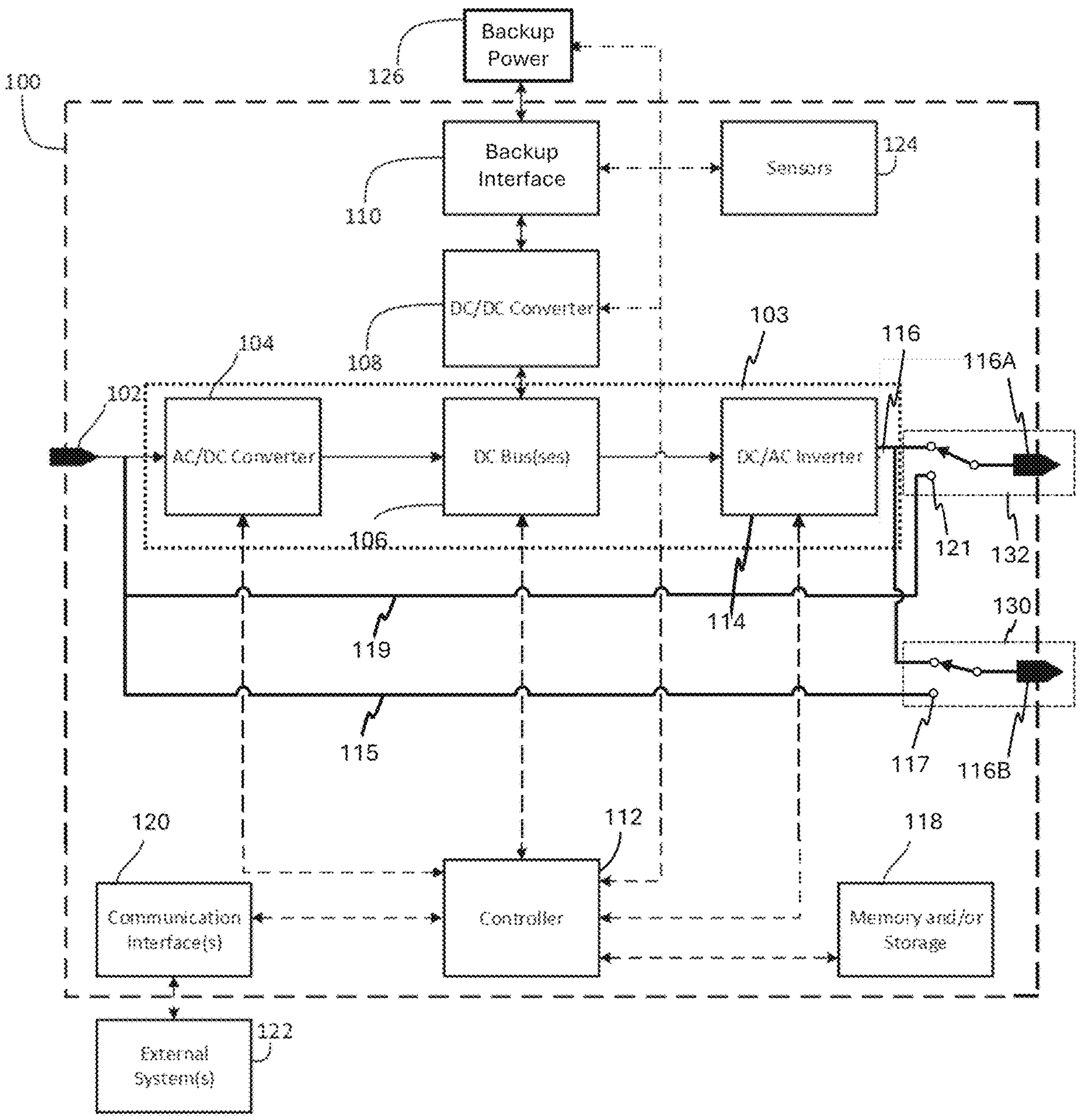
FIG. 2 is a block diagram of an example of a UPS, according to aspects of the invention.
Figure 3:
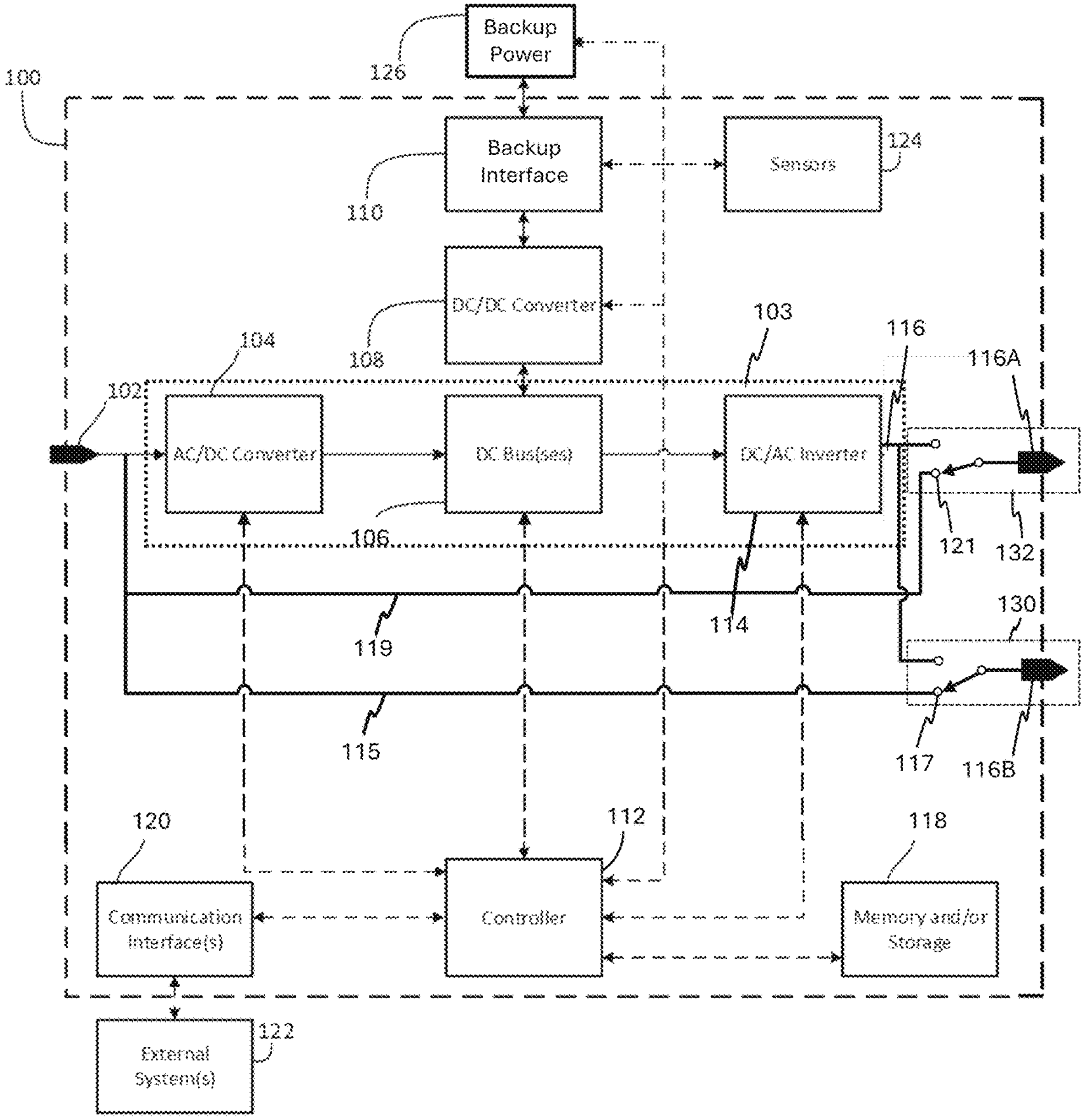
FIG. 3 is a block diagram of an example of a UPS, according to aspects of the invention.

FIGS. 1-3 are block diagrams of a UPS 100 according to various examples. With reference to FIG. 1, the UPS 100 includes an input 102, power conversion circuitry 103, a DC/DC converter 108, a backup interface 110, at least one controller 112 ("controller 112"), a first bypass line 115, a first relay 130 connected to the first bypass line 115, a first output connector 116A, a second output 117, a second output connector 116B, a memory and/or storage 118, one or more communication interfaces 120 ("communication interfaces 120") which may be communicatively coupled to one or more external systems 122 ("external systems 122"), and one or more voltage sensors and/or current sensors 124 ("sensors 124"). In at least one embodiment, the power conversion circuitry 103 includes an AC/DC converter 104, one or more DC busses 106, and a DC/AC inverter 114 having first output 116. The controller 112 controls the operation of the AC/DC converter 104, the inverter 114, and various other components as discussed in more detail below, such as the first relay 130 and the second relay 132. While the above description generally describes an online UPS architecture, the general scheme described herein, i.e., the inclusion of at least one relay and at least one bypass line configured to be coupled to non-critical loads, also applies to line interactive UPS systems which can have a similar architecture to online UPS systems as disclosed herein.

The input 102 is coupled to the AC/DC converter 104 and to an AC power source (not pictured), such as an AC mains power supply. The AC/DC converter 104 is coupled to the input 102 and to the one or more DC busses 106 and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the backup interface 110 and is communicatively coupled to the controller 112. The backup interface 110 is coupled to the DC/DC converter 108 and is configured to be coupled to at least one backup power source 126, e.g., a battery, and/or another energy storage device. In some examples, the backup interface 110 is configured to be communicatively coupled to the controller 112.

In some examples, the UPS 100 may be external to the at least one source of backup power 126 and may be coupled to the at least one source of backup power 126 via the backup interface 110. In various examples, the UPS 100 may include one or more sources of backup power, which may include the at least one source of backup power 126. The at least one source of backup power 126 may include one or more batteries, capacitors, flywheels, or other sources of backup power in various examples.

The DC/AC inverter 114 is coupled to the one or more DC busses 106 and to the output 116 and is communicatively coupled to the controller 112. The first output 116 is coupled to the DC/AC inverter 114, and is configured to be coupled to an external load via first output connector 116A. The controller 112 is communicatively coupled to the AC/DC converter 104, the one or more DC busses 106, the DC/DC converter 108, the backup interface 110, the DC/AC inverter 114, the first bypass line 115, the first relay 130, the second output 117, the memory and/or storage 118, the communication interfaces 120, and/or the at least one energy storage device 126. The sensors 124 are communicatively coupled to the controller 112 and may be coupled to one or more components of the UPS 100, such as the input 102, the AC/DC converter 104, the one or more DC busses 106, the DC/DC converter 108, the backup interface 110, the DC/AC inverter 114, the first bypass line 115, the first relay 130, the second output 117, the first output connector 116A, and/or the second output connector 116B.

The input 102 is configured to be coupled to an AC mains power source and to receive input AC power having an input voltage level and an input frequency. The UPS 100 is configured to operate in different modes of operation based on the input voltage and/or frequency of the AC power provided to the input 102. The controller 112 may determine a mode of operation in which to operate the UPS 100 based on whether an input parameter, such as the input voltage of the AC power or an input frequency of the input power is acceptable. The controller 112 may include or be coupled to one or more sensors, such as the sensors 124, configured to sense parameters of the input voltage. For example, the sensors 124 may include one or more voltage and/or current sensors coupled to the input 102 and being configured to sense information indicative of a voltage or frequency at the input 102 and provide the sensed information to the controller 112. In another example, the sensors 124 may include one or more voltage and/or current sensors coupled to the DC/AC inverter 114 and being configured to sense information indicative of an output voltage at the DC/AC inverter 114 and provide the sensed information to the controller 112.

When AC power provided to the input 102 is acceptable (for example, by having input parameters, such as an input voltage value, that meet specified values, such as by falling within a range of acceptable input voltage values), the controller 112 controls components of the UPS 100 to operate in a normal, e.g., online, mode of operation. In the online mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the backup interface 110. The backup interface 110 receives the converted DC power and provides the converted DC power to the at least one source of backup power 126 to charge the at least one source of backup power 126. The DC/AC inverter 114 receives DC power from the one or more DC busses 106, converts the DC power into regulated AC power, and provides the regulated AC power to the first output 116 to which a load can be connected thereto at first output connector 116A.

As further illustrated in FIG. 1, first bypass line 115 directly connects the input 102 to the first relay 130. The first relay 130 is connected to second output 117, to which non-critical loads (not illustrated) can be connected to UPS 100 via second output connector 116B. The first relay 130 can also direct power from the DC/AC inverter 114 through the first output 116 and first output connector 116B when necessary, as the first relay 130 includes a direct connection to the DC/AC inverter 114. The controller 112 monitors (e.g., via sensors 124) the line voltage at input 102 or the input frequency of the power at input 102 and controls the operation of the first relay 130 based on the sensed line voltage or input frequency of the input power at the input 102. In at least one embodiment, when the mains voltage at the input 102 is within a first range set by $V1_{min}$ and $V1_{max}$, the first relay 130 is operated by the controller 112 such that second output 116B, i.e., non-critical loads, is energized directly from the input 102 through first bypass line 115. The first range set by $V1_{min}$ and $V1_{max}$, is generally between 210-240 V but will be dependent on the power delivery standard of the locale the UPS 100 is located in.

When the power from the input 102 falls outside of the normal operational range set by $V1_{min}$ and $V1_{max}$, e.g., within the second range set by $V2_{min}$ between 160 V-210 V and $V2_{max}$ between 240 V-275 V for a nominal input voltage of 210-240 V, the first relay 130 can be operated by the controller 112 such that second output connector 116B, i.e., non-critical loads, also receives regulated AC power from the DC/AC inverter 114 through the first output 116. The first output connector 116A is energized in standard double conversion, i.e., online, mode where power is delivered from the DC/AC inverter 114 through first output 116. As such, the critical loads connected to the first output connector 116A will not be subject to the potential instability of the direct connection between the input 102 and first output connector 116A but greater power delivery efficiencies can be realized for the non-critical loads attached to second output connector 116B.

FIG. 2 illustrates an alternate power delivery condition using the first relay 130 and a second relay 132 operatively connected between the first output 116 and the first output connector 116A. As illustrated in FIG. 2, the second relay 132 selectively couples the first output connector 116A to either a second bypass line 119, terminating in a third output 121, or the first output 116. The first bypass line 115 and the associated power transmission components, i.e., second output 117 and first relay 130, remain unchanged. As disclosed herein, the operational voltage range for standard double conversion, i.e., online, mode is generally, for a 210-240 V AC mains power at input 102, a $V2_{min}$ between 160 V-210 V and $V2_{max}$ between 240 V-275 V. With the embodiment illustrated in FIG. 2, either or both of first relay 130 and second relay 132 can be independently operated by controller 112. For example, the second relay 132 can be operated by controller 112 to remain in a position that provides for a direct connection between power conversion circuitry 103 and the first output connector 116A, i.e., the configuration illustrated in FIG. 1 where the first output connector 116A operates in double conversion mode at all times within the $V1_{min}$ and $V1_{max}$ window of 210-240 V. In this configuration, first bypass line 115 directly connects the input 102 to the first relay 130. The first relay 130 is connected to second output 117, to which non-critical loads (not illustrated) can be connected to UPS 100 via second output connector 116B and receive unregulated AC power from the input 100.

With continued reference to FIG. 2, the dual relay configuration permits both relays to be energized from the same power delivery component in UPS 100. When the mains voltage at the input 102 is outside of the first range set by $V1_{min}$ and $V1_{max}$ but is within the second range defined by $V2_{min}$ and $V2_{max}$, both of the first output connector 116A and the second output connector 116B are operated in standard double conversion, i.e., online, mode. In this situation, the first relay 130 is actuated by the controller 112 to connect the second output connector 116B to the DC/AC inverter 114 without passing through the first bypass line 115. Thus, all loads, e.g., critical and non-critical, are energized by the UPS 100 in standard double conversion, i.e., online, mode without making use of either first bypass line 115 or second bypass line 119.

When AC power provided to the input 102 from the AC mains power source is not acceptable, e.g., when the AC mains power source has an interruption or deficiency in power delivery, UPS 100 may operate in a backup mode of operation in response to the input parameter being outside of the second range. When the power from the input 102 falls outside of the normal operational range set by $V1_{min}$ and $V1_{max}$, e.g., no power being delivered from input 102, the delivered power is less than $V2_{min}$ having a range between 160 V-210 V, or the delivered power is higher than $V2_{max}$ having a range between 240 V-275 V, the controller 112 controls components of the UPS 100 to operate in the backup mode of operation. In the backup mode of operation, DC power is discharged from the at least one source of backup power 126 to the backup interface 110, and the backup interface 110 provides the discharged DC power to the DC/DC converter 108. The DC/DC converter 108 converts the received DC power and distributes the regulated DC power amongst the one or more DC busses 106. For example, the DC/DC converter 108 may evenly distribute the regulated DC power amongst the one or more DC busses 106. The one or more DC busses 106 provide the regulated DC power to the DC/AC inverter 114. The DC/AC inverter 114 receives the DC power from the one or more DC busses 106, converts the DC power into regulated AC power, and provides the regulated AC power to the first output 116A and the second output 116B. In the backup mode, the controller 112 further operates the first relay 130 to couple the second output connector 116B to the first output 116 such that the regulated AC power derived from the at least one source of backup power 126 is used to power loads attached to the second output connector 116B.

According to at least one embodiment, when UPS 100 is configured as a line interactive UPS system, if the frequency of the input power is outside of the acceptable range, e.g., as disclosed herein, even if the input voltage is within the acceptable range as disclosed herein, UPS 100 will switch over to the backup mode of operation and draw power from the at least one source of backup power 126.

In a further mode of operation, termed startup mode and illustrated in FIG. 3, the second relay 132 can be actuated by controller 112 to connect the input 102 directly to the first output connector 116A by transmission through the second bypass line 119 to third output 121, i.e., the second relay 132 is actuated to couple the first output connector 116A (via third output 121) to the second bypass line 119. Also in startup mode, the input 102 is connected to the second output 117 and second output connector 116B. In this configuration, neither first output connector 116A or second output connector 116B is connected to the double conversion output, i.e., DC/AC inverter 114. Startup mode is typically used when the power requirements for the connected loads at first output connector 116A exceed the power that can be instantaneously or momentarily delivered by the double conversion output, i.e., DC/AC inverter 114. Once sufficient power has been delivered from the AC mains from input 102 to connected loads at first output connector 116A, the second relay 132 is actuated to couple the first output connector 116A to the first output 116, i.e., subsequent to the input power being provided to the first output connector 116A via the second bypass line 119 for a period of time, the second relay 132 is operated to couple the first output connector 116A to the first output 116.

In some embodiments, the controller 112 will operate the first relay 130 to couple the second output connector 116B to the first bypass line 115 in response to the input parameter being within a first range of about ±30V range about a magnitude of a nominal input voltage, inclusive. For example, the first range may be 0V to −30V about the magnitude of the nominal input voltage, e.g., 0V, −1V, −2V, −3V, −4V, −5V, −6V, −7V, −8V, −9V, −10V, −11V, −12V, −13V, −14V, −15V, −16V, −17V, −18V, −19V, −20V, −21V, −22V, −23V, −24V, −25V, −26V, −27V, −28V, −29V, or −30V. In some embodiments, the first range may be 0V to +30V about the magnitude of the nominal input voltage, e.g., 0V, +1V, +2V, +3V, +4V, +5V, +6V, +7V, +8V, +9V, +10V, +11V, +12V, +13V, +14V, +15V, +16V, +17V, +18V, +19V, +20V, +21V, +22V, +23V, +24V, +25V, +26V, +27V, +28V, +29V, or +30V.

In some embodiments, the controller 112 will operate the first relay 130 to couple the second output connector 116B to the first bypass line 115 in response to the input parameter being within a first range of about ±3 Hz range about a magnitude of a nominal frequency, inclusive. In general, the nominal frequency for electrical power distribution is between about 50 Hz to about 60 Hz, and will depend on the locale the UPS 100 will be operating in. For example, the first range may be 0 Hz to −3 Hz about the magnitude of the nominal frequency, e.g., 0 Hz, −0.25 Hz, −0.5 Hz, −0.75 Hz, −1 Hz, −1.25 Hz, −1.5 Hz, −1.75 Hz, −2 Hz, −2.25 Hz, −2.5 Hz, −2.75 Hz, or −3 Hz. In some embodiments, the first range may be 0 Hz to +3 Hz about the magnitude of the nominal frequency, e.g., 0 Hz, +0.25 Hz, +0.5 Hz, +0.75 Hz, +1 Hz, +1.25 Hz, +1.5 Hz, +1.75 Hz, +2 Hz, +2.25 Hz, +2.5 Hz, +2.75 Hz, or +3 Hz.

In some examples, the sensors 124 may include one or more sensors coupled to one or more of the foregoing components such that a voltage and/or current of one or more of the foregoing components may be determined by the controller 112. The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

In accordance with an aspect, there is provided a non-transitory computer-readable medium storing thereon instructions for operating an uninterruptable power supply. The uninterruptable power supply may include an input coupled to a power source, power conversion circuitry coupled to the input, a first output coupled to the power conversion circuitry, a second output, a first bypass line coupled between the input and the second output; a first output connector coupled to a first load, and a second output connector coupled to a second load. The instructions may instruct at least one processor to control the UPS to monitor an input parameter of input power received by the input. The instructions may instruct at least one processor to control the UPS operate the power conversion circuitry to convert the input power into regulated output power. The instructions further may instruct at least one processor to control the UPS to provide the regulated output power to the first output connector via the first output. The instructions may instruct at least one processor to control the UPS to operate a first relay to couple the second output connector to the first bypass line in response to the input parameter being within a first range such that the input power is provided to the second output connector. The instructions additionally may instruct at least one processor to control the UPS to operate the first relay to couple the second output connector to the first output in response to the input parameter being outside of the first range, such that the regulated output power is provided to the second output connector.

In some embodiments, the input parameter may be at least one of an input voltage of the input power or an input frequency of the input power. In further embodiments, the instructions may instruct the at least one processor to control the UPS to operate the first relay to couple the second output connector to the first bypass line in response to the input voltage of the input power being within a ±30 V range about a magnitude of a nominal input voltage. In further embodiments, the instructions may instruct the at least one processor to control the UPS to operate the first relay to couple the second output connector to the first bypass line in response to the input frequency of the input power being within a ±3 Hz range about a magnitude of a nominal input frequency of the input power.

In some embodiments, the UPS further may include a third output and a second bypass line coupled between the input and the third output. In this configuration, the instructions further may instruct the at least one processor to control the UPS, in a startup mode of operation, to operate a second relay to couple the first output connector to the second bypass line such that the input power is provided to the first output connector. In further embodiments, the instructions may instruct the at least one processor to control the UPS, subsequent to the input power being provided to the first output via the second bypass line for a period of time, to operate the second relay to couple the first output connector to the first output.

In some embodiments, the UPS further may include a backup interface configured to be coupled to a backup power source and to receive backup power from the backup power source. In this configuration, the instructions further may instruct the at least one processor to control the UPS to operate in a backup mode of operation in response to the input parameter being outside of a second range. In some embodiments, the instructions further may instruct the at least one processor to control the UPS to operate, in the backup mode of operation, the power conversion circuitry to convert the backup power into the regulated output power. In some embodiments, the instructions further may instruct the at least one processor to control the UPS to operate, in the backup mode of operation, the first relay to couple the second output connector to the first output.

In accordance with an aspect, there is provided a method of operating an uninterruptable power supply. The uninterruptable power supply may include an input coupled to a power source, power conversion circuitry coupled to the input, a first output coupled to the power conversion circuitry, a second output, a first bypass line coupled between the input and the second output, a first output connector coupled to a first load, and a second output connector coupled to a second load. The method may include monitoring an input parameter of input power received by the input. The method may include operating the power conversion circuitry to convert the input power into regulated output power. The method further may include providing the regulated output power to the first output connector via the first output. The method further may include operating a first relay to couple the second output connector to the first bypass line in response to the input parameter being within a first range such that the input power is provided to the second output connector. The method additionally may include operating the first relay to couple the second output connector to the first output in response to the input parameter being outside of the first range such that the regulated output power is provided to the second output connector.

In some embodiments, the input parameter may be at least one of an input voltage of the input power or an input frequency of the input power. In some embodiments, operating the first relay to couple the second output connector to the first bypass line includes operating the first relay to couple the second output connector to the first bypass line in response to the input voltage of the input power being within a ±30 V range about a magnitude of a nominal input voltage. In some embodiments, operating the first relay to couple the second output connector to the first bypass line includes operating the first relay to couple the second output connector to the first bypass line in response to the input frequency of the input power being within a ±3 Hz range about a magnitude of a nominal input frequency of the input power.

In further embodiments, the uninterruptable power supply may include a third output and a second bypass line coupled between the input and the third output. In this configuration, the method further may include operating, in a startup mode of operation, a second relay to couple the first output connector to the second bypass line such that the input power is provided to the first output connector. In further embodiments, the method may include, subsequent to the input power being provided to the first output via the second bypass line for a period of time in the startup mode of operation, operate the second relay to couple the first output connector to the first output.

In further embodiments, the uninterruptable power supply may include a backup interface configured to be coupled to a backup power source and to receive backup power from the backup power source. In this configuration, the method further may include operating the UPS in a backup mode of operation in response to the input parameter being outside of a second range. In further embodiments, the method may include operating, in the backup mode of operation, the power conversion circuitry to convert the backup power into the regulated output power. In further embodiments, the method may include operating, in the backup mode of operation, the first relay to couple the second output connector to the first output.

The disclosure herein is further presented as a non-limiting list of numbered embodiments.

1. An uninterruptable power supply, comprising:
an input;
a first output;
a second output;
a first bypass line coupled between the input and the second output;
a first output connector configured to be coupled to a first load;
a second output connector configured to be coupled to a second load; and
a first relay configured to selectively couple the second output connector to either the first output or the first bypass line.

2. The uninterruptible power supply of embodiment 1, further comprising:
a controller configured to:
monitor an input parameter of input power at the input,
operate the first relay to couple the second output connector to the first bypass line in response to the input parameter being within a first range; and
operate the first relay to couple the second output connector to the first output in response to the input parameter being outside of the first range.

3. The uninterruptible power supply of embodiment 2, wherein the input parameter is at least one of an input voltage of the input power or an input frequency of the input power.

4. The uninterruptible power supply of embodiment 2, wherein the first range is about ±30 V range about a magnitude of a nominal input voltage.

5. The uninterruptible power supply of embodiment 2, wherein the first range is about ±3 Hz range about a magnitude of a nominal input frequency of the input power.

6. The uninterruptible power supply of embodiment 2, further comprising:
a third output;
a second bypass line coupled between the input and the third output; and
a second relay configured to selectively couple the first output to either the first output or the second bypass line.

7. The uninterruptible power supply of embodiment 6, wherein the controller is further configured, in a startup mode of operation, to:
operate the second relay to couple the first output connector to the second bypass line; and
subsequent to the input power being provided to the first output via the second bypass line for a period of time, operate the second relay to couple the first output connector to the first output.

8. The uninterruptible power supply of embodiment 2, further comprising a backup interface configured to be coupled to a backup power source and to receive backup power from the backup power source.

9. The uninterruptible power supply of embodiment 8, wherein the controller is further configured to:

operate in a backup mode of operation in response to the input parameter being outside of a second range;

operate, in the backup mode of operation, the power conversion circuitry to convert the backup power into the regulated output power; and operate, in the backup mode of operation, the first relay to couple the second output connector to the first output.

10. A non-transitory computer-readable medium storing thereon instructions for operating an uninterruptable power supply comprising an input; a first output; a second output; a first bypass line coupled between the input and the second output; a first output connector coupled to a first load; and a second output connector coupled to a second load; the instructions instructing at least one processor to control the UPS to:

monitor an input parameter of input power received by the input, provide output power to the first output connector via the first output;

operate a first relay to couple the second output connector to the first bypass line in response to the input parameter being within a first range such that the input power is provided to the second output connector; and operate the first relay to couple the second output connector to the first output in response to the input parameter being outside of the first range such that the output power is provided to the second output connector.

11. The non-transitory computer-readable medium of embodiment 10, wherein the input parameter is at least one of an input voltage of the input power or an input frequency of the input power.

12. The non-transitory computer-readable medium of embodiment 11, wherein the instructions further instruct the at least one processor to control the UPS to operate the first relay to couple the second output connector to the first bypass line in response to the input voltage of the input power being within a ±30 V range about a magnitude of a nominal input voltage.

13. The non-transitory computer-readable medium of embodiment 11, wherein the instructions further instruct the at least one processor to control the UPS to operate the first relay to couple the second output connector to the first bypass line in response to the input frequency of the input power being within a ±3 Hz range about a magnitude of a nominal input frequency of the input power.

14. The non-transitory computer-readable medium of embodiment 10, wherein the UPS further comprises a third output, and a second bypass line coupled between the input and the third output, and wherein the instructions further instruct the at least one processor to control the UPS, in a startup mode of operation, to:

operate a second relay to couple the first output connector to the second bypass line such that the input power is provided to the first output connector; and subsequent to the input power being provided to the first output via the second bypass line for a period of time, operate the second relay to couple the first output connector to the first output.

15. The non-transitory computer-readable medium of embodiment 10, wherein the UPS further comprises a backup interface configured to be coupled to a backup power source and to receive backup power from the backup power source, and wherein the instructions further instruct the at least one processor to control the UPS to:

operate in a backup mode of operation in response to the input parameter being outside of a second range;

operate, in the backup mode of operation, the power conversion circuitry to convert the backup power into the regulated output power; and operate, in the backup mode of operation, the first relay to couple the second output connector to the first output.

16. A method of operating an uninterruptable power supply comprising an input; a first output; a second output; a first bypass line coupled between the input and the second output; a first output connector coupled to a first load; and a second output connector coupled to a second load, the method comprising:

monitoring an input parameter of an input power received by the input, providing output power to the first output connector via the first output;

operating a first relay to couple the second output connector to the first bypass line in response to the input parameter being within a first range such that the input power is provided to the second output connector; and operating the first relay to couple the second output connector to the first output in response to the input parameter being outside of the first range such that the output power is provided to the second output connector.

17. The method of embodiment 16, wherein the input parameter is at least one of an input voltage of the input power or an input frequency of the input power.

18. The method of embodiment 17, wherein operating the first relay to couple the second output connector to the first bypass line includes operating the first relay to couple the second output connector to the first bypass line in response to the input voltage of the input power being within a ±30 V range about a magnitude of a nominal input voltage.

19. The method of embodiment 17, wherein operating the first relay to couple the second output connector to the first bypass line includes operating the first relay to couple the second output connector to the first bypass line in response to the input frequency of the input power being within a ±3 Hz range about a magnitude of a nominal input frequency of the input power.

20. The method of embodiment 16, wherein the UPS further comprises a third output, and a second bypass line coupled between the input and the third output, wherein the method further comprises:

operating, in a startup mode of operation, a second relay to couple the first output connector to the second bypass line such that the input power is provided to the first output connector; and subsequent to the input power being provided to the first output via the second bypass line for a period of time in the startup mode of operation, operate the second relay to couple the first output connector to the first output.

21. The method of embodiment 16, wherein the UPS further comprises a backup interface configured to be coupled to a backup power source and to receive backup power from the backup power source, and wherein the method further comprises:

operating the UPS in a backup mode of operation in response to the input parameter being outside of a second range;

operating, in the backup mode of operation, the power conversion circuitry to convert the backup power into the regulated output power; and operating, in the backup mode of operation, the first relay to couple the second output connector to the first output.

22. An uninterruptable power supply, comprising:

an input configured to be coupled to a power source and to receive input power from the power source;

power conversion circuitry coupled to the input and configured to convert the input power into regulated output power;

a first output coupled to the power conversion circuitry;

a second output;

a first bypass line coupled between the input and the second output and configured to provide the input power to the second output;

a first output connector configured to be coupled to a first load and to receive the regulated output power from the power conversion circuitry;

a second output connector configured to be coupled to a second load; and a first relay configured to selectively couple the second output connector to either the first output or the first bypass line.

23. A non-transitory computer-readable medium storing thereon instructions for operating an uninterruptable power supply comprising an input coupled to a power source; power conversion circuitry coupled to the input; a first output coupled to the power conversion circuitry; a second output; a first bypass line coupled between the input and the second output; a first output connector coupled to a first load; and a second output connector coupled to a second load; the instructions instructing at least one processor to control the UPS to:

monitor an input parameter of input power received by the input, operate the power conversion circuitry to convert the input power into regulated output power;

provide the regulated output power to the first output connector via the first output;

operate a first relay to couple the second output connector to the first bypass line in response to the input parameter being within a first range, such that the input power is provided to the second output connector; and operate the first relay to couple the second output connector to the first output in response to the input parameter being outside of the first range, such that the regulated output power is provided to the second output connector.

24. A method of operating an uninterruptable power supply comprising an input coupled to a power source; power conversion circuitry coupled to the input; a first output coupled to the power conversion circuitry; a second output; a first bypass line coupled between the input and the second output; a first output connector coupled to a first load; and a second output connector coupled to a second load, the method comprising:

monitoring an input parameter of input power received by the input, operating the power conversion circuitry to convert the input power into regulated output power;

providing the regulated output power to the first output connector via the first output;

operating a first relay to couple the second output connector to the first bypass line in response to the input parameter being within a first range, such that the input power is provided to the second output connector; and operating the first relay to couple the second output connector to the first output in response to the input parameter being outside of the first range, such that the regulated output power is provided to the second output connector.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply, comprising:

an input;

a first output;

a second output;

a first bypass line coupled between the input and the second output;

a first output connector configured to be coupled to a first load;

a second output connector configured to be coupled to a second load; and a first relay configured to selectively couple the second output connector to either the first output or the first bypass line.

2. The uninterruptible power supply of claim 1, further comprising:

a controller configured to:

monitor an input parameter of input power at the input, operate the first relay to couple the second output connector to the first bypass line in response to the input parameter being within a first range; and operate the first relay to couple the second output connector to the first output in response to the input parameter being outside of the first range.

3. The uninterruptible power supply of claim 2, wherein the input parameter is at least one of an input voltage of the input power or an input frequency of the input power.

4. The uninterruptible power supply of claim 2, wherein the first range is about ±30 V range about a magnitude of a nominal input voltage.

5. The uninterruptible power supply of claim 2, wherein the first range is about ±3 Hz range about a magnitude of a nominal input frequency of the input power.

6. The uninterruptible power supply of claim 2, further comprising:

a third output;

a second bypass line coupled between the input and the third output; and a second relay configured to selectively couple the first output connector to either the first output or the second bypass line.

7. The uninterruptible power supply of claim 6, wherein the controller is further configured, in a startup mode of operation, to:

operate the second relay to couple the first output connector to the second bypass line; and subsequent to the input power being provided to the first output via the second bypass line for a period of time, operate the second relay to couple the first output connector to the first output.

8. The uninterruptible power supply of claim 2, further comprising a backup interface configured to be coupled to a backup power source and to receive backup power from the backup power source.

9. The uninterruptible power supply of claim 8, wherein the controller is further configured to:

operate in a backup mode of operation in response to the input parameter being outside of a second range;

operate, in the backup mode of operation, a power conversion circuitry to convert the backup power into the regulated output power; and operate, in the backup mode of operation, the first relay to couple the second output connector to the first output.

10. A non-transitory computer-readable medium storing thereon instructions for operating an uninterruptible power supply (UPS) comprising an input; a first output; a second output; a first bypass line coupled between the input and the second output; a first output connector coupled to a first load; and a second output connector coupled to a second load; the instructions instructing at least one processor to control the UPS to:

monitor an input parameter of input power received by the input, provide output power to the first output connector via the first output;

operate a first relay to couple the second output connector to the first bypass line in response to the input parameter being within a first range such that the input power is provided to the second output connector; and operate the first relay to couple the second output connector to the first output in response to the input parameter being outside of the first range such that the output power is provided to the second output connector.

11. The non-transitory computer-readable medium of claim 10, wherein the input parameter is at least one of an input voltage of the input power or an input frequency of the input power.

12. The non-transitory computer-readable medium of claim 11, wherein the instructions further instruct the at least one processor to control the UPS to operate the first relay to couple the second output connector to the first bypass line in response to the input voltage of the input power being within a ±30 V range about a magnitude of a nominal input voltage.

13. The non-transitory computer-readable medium of claim 11, wherein the instructions further instruct the at least one processor to control the UPS to operate the first relay to couple the second output connector to the first bypass line in response to the input frequency of the input power being within a ±3 Hz range about a magnitude of a nominal input frequency of the input power.

14. The non-transitory computer-readable medium of claim 10, wherein the UPS further comprises a third output, and a second bypass line coupled between the input and the third output, and wherein the instructions further instruct the at least one processor to control the UPS, in a startup mode of operation, to:

operate a second relay to couple the first output connector to the second bypass line such that the input power is provided to the first output connector; and subsequent to the input power being provided to the first output via the second bypass line for a period of time, operate the second relay to couple the first output connector to the first output.

15. The non-transitory computer-readable medium of claim 10, wherein the UPS further comprises a backup interface configured to be coupled to a backup power source and to receive backup power from the backup power source, and wherein the instructions further instruct the at least one processor to control the UPS to:

operate in a backup mode of operation in response to the input parameter being outside of a second range;

operate, in the backup mode of operation, a power conversion circuitry to convert the backup power into a regulated output power; and operate, in the backup mode of operation, the first relay to couple the second output connector to the first output.

16. A method of operating an uninterruptible power supply (UPS) comprising an input; a first output; a second output; a first bypass line coupled between the input and the second output; a first output connector coupled to a first load; and a second output connector coupled to a second load, the method comprising:

monitoring an input parameter of an input power received by the input, providing output power to the first output connector via the first output;

operating a first relay to couple the second output connector to the first bypass line in response to the input parameter being within a first range such that the input power is provided to the second output connector; and operating the first relay to couple the second output connector to the first output in response to the input parameter being outside of the first range such that the output power is provided to the second output connector.

17. The method of claim 16, wherein the input parameter is at least one of an input voltage of the input power or an input frequency of the input power.

18. The method of claim 17, wherein operating the first relay to couple the second output connector to the first bypass line includes operating the first relay to couple the second output connector to the first bypass line in response to the input voltage of the input power being within a ±30 V range about a magnitude of a nominal input voltage.

19. The method of claim 16, wherein the UPS further comprises a third output, and a second bypass line coupled between the input and the third output, wherein the method further comprises:

operating, in a startup mode of operation, a second relay to couple the first output connector to the second bypass line such that the input power is provided to the first output connector; and subsequent to the input power being provided to the first output via the second bypass line for a period of time in the startup mode of operation, operating the second relay to couple the first output connector to the first output.

20. The method of claim 16, wherein the UPS further comprises a backup interface configured to be coupled to a backup power source and to receive backup power from the backup power source, and wherein the method further comprises:

operating the UPS in a backup mode of operation in response to the input parameter being outside of a second range;

operating, in the backup mode of operation, a power conversion circuitry to convert the backup power into a regulated output power; and operating, in the backup mode of operation, the first relay to couple the second output connector to the first output.

* * * * *